(12) United States Patent
Piefer et al.

(10) Patent No.: US 12,342,447 B2
(45) Date of Patent: Jun. 24, 2025

(54) ION SOURCE AND NEUTRON GENERATOR (71) Applicant: SHINE Technologies, LLC, Janesville, WI (US)

(72) Inventors: Gregory Piefer, Janesville, WI (US); Richard Sisson, Janesville, WI (US)

(73) Assignee: SHINE Technologies, LLC, Janesville, WI (US)

(*) Notice: Subject to any disclaimer, the term of this patent is extended or adjusted under 35 U.S.C. 154(b) by 516 days.

(21) Appl. No.: 17/604,634

(22) PCT Filed: Sep. 6, 2019

(86) PCT No.: PCT/US2019/050060
§ 371 (c)(1),
(2) Date: Oct. 18, 2021

(87) PCT Pub. No.: WO2020/214197
PCT Pub. Date: Oct. 22, 2020

(65) Prior Publication Data
US 2022/0232692 A1    Jul. 21, 2022

Related U.S. Application Data

(60) Provisional application No. 62/836,481, filed on Apr. 19, 2019.

(51) Int. Cl.
*H05H 3/06* (2006.01)
*H05H 7/08* (2006.01)

(52) U.S. Cl.
CPC .............. *H05H 3/06* (2013.01); *H05H 7/08* (2013.01); *H05H 2007/082* (2013.01)

(58) Field of Classification Search
CPC ....... H05H 3/06; H05H 7/08; H05H 2007/082
(Continued)

(56) References Cited

U.S. PATENT DOCUMENTS 2,689,918 A    9/1954  Youmans
3,084,256 A    4/1963  Tittle et al.
(Continued)

FOREIGN PATENT DOCUMENTS

EP    1 113 088 A1    7/2001
GB    0 778 656 A     7/1957
GB    2 386 747 A     9/2003

OTHER PUBLICATIONS

Ghodke, "Fabrication of compact electron gun for 6 MeV X-ray source", In 2014 International Symposium on Discharges and Electrical Insulation in Vacuum (ISDEIV), pp. 557-560, IEEE, 2014. (Year: 2014).*

(Continued)

*Primary Examiner* — Jack W Keith
*Assistant Examiner* — Daniel Wasil
(74) *Attorney, Agent, or Firm* — Foley & Lardner LLP (57) ABSTRACT

A nuclear reaction generator includes a chamber configured to contain a gas and including a target. The nuclear reaction generator also includes a filament provided inside the chamber and a voltage source configured to apply a first positive voltage to the filament relative to the chamber. The first positive voltage is configured to heat the filament to a temperature at which thermionic emission occurs and a plurality of thermions are generated, and the plurality of thermions is configured to ionize the gas to generate positive ions in the chamber. The target is configured such that nuclear reactions occur when the positive ions interact with the target.

30 Claims, 5 Drawing Sheets

(58) Field of Classification Search
USPC .......................................................... 376/108
See application file for complete search history.

(56) References Cited

U.S. PATENT DOCUMENTS

| | | | |
|---|---|---|---|
| 3,588,593 | A | 6/1971 | Rabinowitz et al. |
| 3,761,708 | A | 9/1973 | Roepke et al. |
| 4,155,825 | A | 5/1979 | Fournier |
| 4,267,007 | A | 5/1981 | Kellogg |
| 5,554,852 | A | 9/1996 | Bright et al. |
| 5,856,674 | A | 1/1999 | Kellerman |
| 7,362,842 | B2 | 4/2008 | Leung |
| 2006/0226355 | A1 | 10/2006 | Watanabe et al. |

OTHER PUBLICATIONS

Martone, "The 14 MeV frascati neutron generator", Journal of nuclear materials 212 (1994): 1661-1664. (Year: 1994).*

International Preliminary Report on Patentability for PCT PCT/US2019/050060 Dtd Oct. 28, 2021.

International Search Report on PCT PCT/US2019/050060 Dtd Nov. 18, 2019.

"Basics of Vacuum Technology", Zhongyi Hua, pp. 52-64, Shanghai Scientific & Technical Publishers, Jan. 1959.

"Electron Spectroscopy", Qing Zhou, pp. 260-263, Nankai University Press, Nov. 1995.

"High Vacuum Technology and Equipment", Zhongyi Hua et al., pp. 52-55, Shanghai Scientific & Technical Publishers, Mar. 1959.

"Industrial Electronics vol. 1", Huazhong Engineering Institute et al., pp. 21-25, People's Education Press, Aug. 1961.

"Ion Plating and Sputtering Technology", Baoqing Chen, pp. 37-43, National Defense Industry Press, Nov. 1990.

"Thin-film Technology", Yixin Yan et al., pp. 92-97, North Industries Press, Mar. 1985.

"Thin-film Technology", Yixin Yan et al., pp. 281-292, North Industries Press, Oct. 1994.

"Vacuum Physics and Technology, and the Applications thereof in Electronic Devices", Hanquan Hu et al., pp. 580-585, National Defense Industry Press, Jun. 1982.

"Vacuum Technology", (NL) Roth, A. et al., pp. 60-62, China Machine Press, Oct. 1980.

Office Action for CN Patent Application No. 201980096485.X dated Oct. 10, 2024.

* cited by examiner

ION SOURCE AND NEUTRON GENERATOR

CROSS-REFERENCE TO RELATED APPLICATIONS

The present application claims the benefit of priority to U.S. Provisional Patent Application No. 62/836,481, filed on Apr. 19, 2019, the contents of which are incorporated herein in their entirety.

FIELD

The present technology is generally related to an ion source and accelerator sharing the same physical space and a method for generating ions and accelerating those ions with the ion source. In some aspects, the ions from the ion source may be accelerated into a target to produce nuclear reactions resulting in neutron production. Thus, the present technology may also be related to systems and methods for generating nuclear reactions with the ion source.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An ion source generally includes a chamber in which ionization takes place, a gas provided in the chamber, and an ionization energy source. Conventional high current ion generation approaches have generally been limited to plasma generation by the use of RF excitation, arc discharges, or filament assisted discharges, which require complex electronic, magnetic, and high vacuum arrangements which are difficult to operate and maintain. These approaches to generate the plasma generally require relatively high gas pressure in the chamber, which can be problematic if the ions generated by the source need to be accelerated within the same spatial volume in which they are generated.

The ions generated by an ion source may be used in a variety of applications including, but not limited to, particle accelerators used in mass spectrometry, medical equipment and diagnostics, and semiconductor manufacturing. The ions generated by the ion source may be accelerated towards a target and used to produce nuclear reactions including those that yield neutrons. Conventional neutron sources employ discrete apparatuses for the ionization, acceleration and target fusion of the ionized species. These neutron sources may include the application of various ion generation approaches, as well as features specific to particle accelerators such as ion extraction, ion acceleration, beam focusing, beam steering and beam stopping. Neutron sources have been developed for a wide variety of applications, for example neutron radiography, material science, condensed matter physics, and non-destructive testing and evaluation of materials. These devices suffer many drawbacks that either limit their available ion current resulting in a neutron yield insufficient for many applications, or are very complex and therefore difficult and expensive to build, maintain, and operate.

In one example, neutrons may be generated by creating ions of deuterium, tritium or a combination thereof, and accelerating these ions into a hydride target loaded with deuterium and/or tritium according to one of the following reactions:

$$D+T \rightarrow n+{}^4He \quad E_n=14.1 \text{ MeV} \quad (1)$$

$$D+D \rightarrow n+{}^3He \quad E_n=2.5 \text{ MeV} \quad (2)$$

Neutron sources based on Reactions (1) and (2) are conventionally single beam, linear electrostatic devices that introduce significant ion losses during transport, which results in excessive heating and reduced neutron yields.

A need exists for improved technology related to ion sources and methods of producing a high rate of ion production at low background pressure, which will allow for increased ion yields and continuous operation for long durations without significant maintenance or support equipment.

SUMMARY

In one aspect, an ion source includes a chamber containing a gas; a filament provided near a center of the chamber; an acceleration grid that is surrounded by the filament; and a voltage source configured to apply a first positive voltage to the filament and a second positive voltage to the acceleration grid. The first positive voltage applied to the filament is configured to heat the filament to a temperature at which thermionic emission occurs and a plurality of thermions are generated. The second positive voltage is greater (more positive) than the first positive voltage. The plurality of thermions is configured to ionize the gas to generate positive ions in an ionization region, for example anywhere in the chamber, including in a region between the filament and the acceleration grid. The first and second positive voltages are held substantially above the voltage at the wall of the chamber, which may be held at ground potential. This creates a recirculating electron trap with electrons oscillating back and forth in the center of the device, which cause ionization of the low-pressure background gas. Ions created in this region will accelerate outward toward the wall of the structure due to the electric field configuration. The pressure in the chamber may be less than 1 millitorr in some embodiments. In other embodiments, the pressure in the chamber may be less than 0.1 millitorr.

In a second aspect, a neutron generator includes a chamber containing a gas; a filament provided near a center of the chamber; an acceleration grid that is surrounded by the filament; a suppression grid that is concentric with and surrounds the filament; a target; and a voltage source configured to apply a first positive voltage to the filament, a second positive voltage to the acceleration grid, and a third negative voltage to the suppression grid. Unless specified otherwise, voltages herein are applied/referenced/measured/etc. relative to the chamber, for example such that a voltage applied to the filament (or other structure) refers to a differential between the filament and the chamber. The first positive voltage applied to the filament is configured to heat the filament to a temperature at which thermionic emission occurs and a plurality of thermions are generated. The second positive voltage is greater than the first positive voltage. The plurality of thermions is configured to ionize the gas to generate positive ions in an ionization region in the chamber, including in a region between the filament and the acceleration grid. The first and second positive voltages are held substantially above the voltage at the wall of the chamber, which may be held at ground potential. This creates a recirculating electron trap with electrons oscillating back and forth in the center of the device, which cause ionization of the low-pressure background gas. Ions created in this region will accelerate outward toward the wall of the structure due to the electric field configuration. The suppression grid will prevent secondary electrons resulting from ion impacts with the vessel wall from accelerating toward the center of the device—an effect that would consume power and reduce efficiency.

In a third aspect, a method for generating ions includes providing a filament and an acceleration grid in a chamber containing gas, the acceleration grid being surrounded by the filament; applying a first positive voltage to the filament to heat the filament to a temperature at which thermionic emission occurs and a plurality of thermions are generated; applying a second positive voltage to the acceleration grid, the second positive voltage being greater than the first positive voltage; and ionizing the gas to generate positive ions in an ionization region in the chamber, including in a region between the filament and the acceleration grid. The thermions may be trapped in the ionization region.

In a fourth aspect, a method for generating neutrons includes providing a filament, an acceleration grid, a suppression grid, and a target in a chamber containing gas; applying a first positive voltage to the filament to heat the filament to a temperature at which thermionic emission occurs and a plurality of thermions are generated; applying a second positive voltage to the acceleration grid, the second positive voltage being greater than the first positive voltage; and ionizing the gas to generate positive ions in an ionization region in the chamber, including in a region between the filament and the acceleration grid. In the fourth aspect, the acceleration grid is concentric with and is surrounded by the filament, the suppression grid is concentric with and surrounds the filament, and the target is concentric with and surrounds the suppression grid. The method may further include applying a negative voltage to the suppression grid. The method may even further include impinging positive ions that pass through the suppression grid upon the target. Impinging positive ions are implanted into the target or impact previously implanted ions to produce a fusion neutron. In addition, secondary electrons may be emitted from the target as a result of impacting previously implanted ions with the impinging ions. Due to an electric potential difference between the filament and the acceleration grid, thermions may be trapped therebetween. Due to an electric potential difference between the target and the suppression to grid to which the negative voltage was applied, secondary electrons may be reflected from the suppression grid towards the target.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

In one aspect, an ion source includes a chamber in which a filament 2, an acceleration grid 3, and a gas are provided. In another aspect, a neutron generator includes a chamber in which a filament 2, an acceleration grid 3, a suppression grid 4, a target 5, and a gas are provided. That is, the target 5 (and, in some embodiments, the suppression grid 4) may be added to the ion source (i.e., the filament 2 and the acceleration grid 3) to form a neutron generator. Both ion sources and neutron generators are within the scope of the present disclosure. Any of the ion sources described herein may be used in a neutron generator as described herein. The systems disclosed herein may also be described as an ion source and divergent accelerator or as a fusion reactor.

In one example of the ion source, the filament 2 is comprised of tungsten or a tungsten alloy and the acceleration grid 3 is comprised of tungsten or a tungsten alloy. In one example of the neutron source, the filament 2 is comprised of tungsten or a tungsten alloy and the acceleration grid 3 is comprised of tungsten or a tungsten alloy, the suppression grid 4 is comprised of tungsten or a tungsten alloy, and the target 5 is comprised of titanium or a titanium alloy (and optionally backed by a low hydrogen solubility metal such as stainless steel). Various other materials and preferred properties of the materials are provided in detail below.

Figure 1:
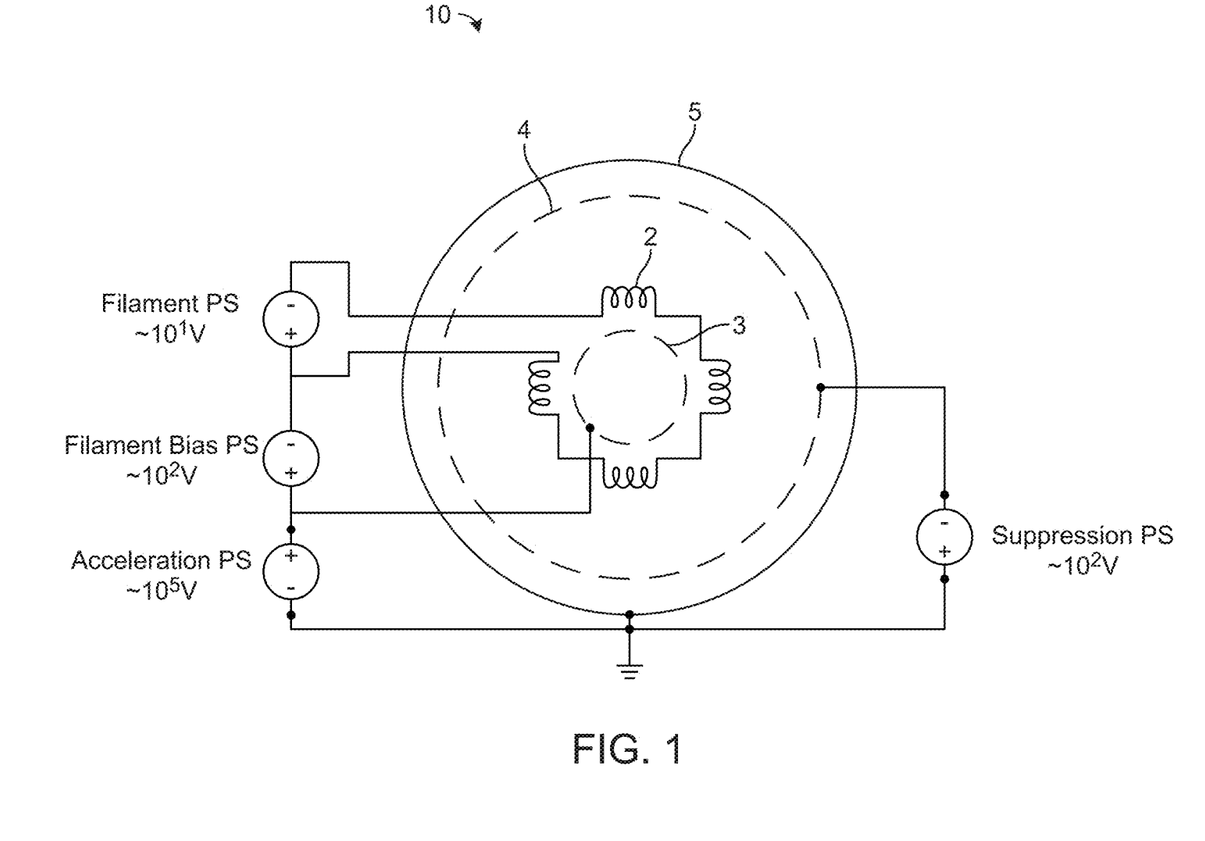
FIG. 1 illustrates a schematic view of an ion source and neutron generator.
Figure 2A:
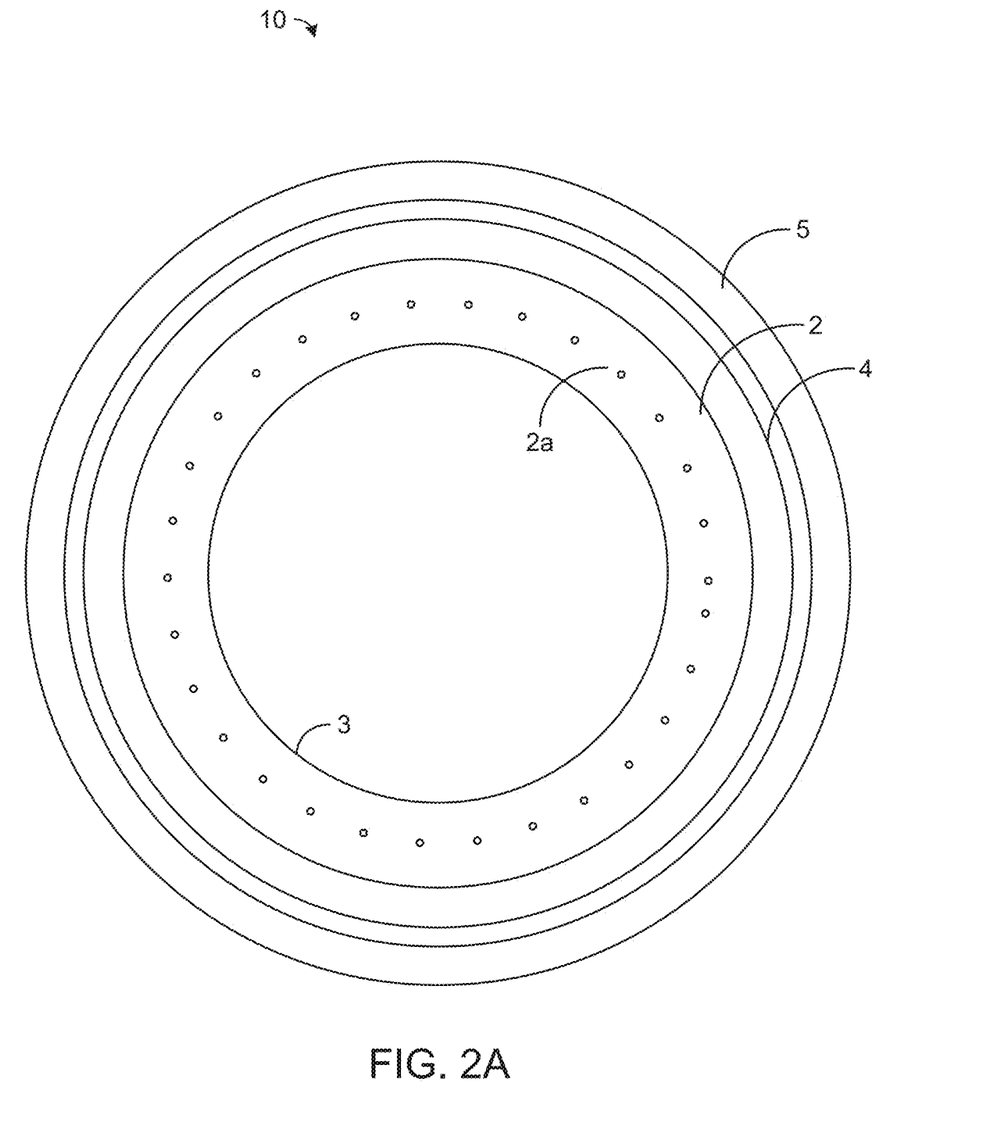
FIG. 2A illustrates a cross-sectional view of the ion source and neutron generator of FIG. 1 including a filament guide.
Figure 2B:
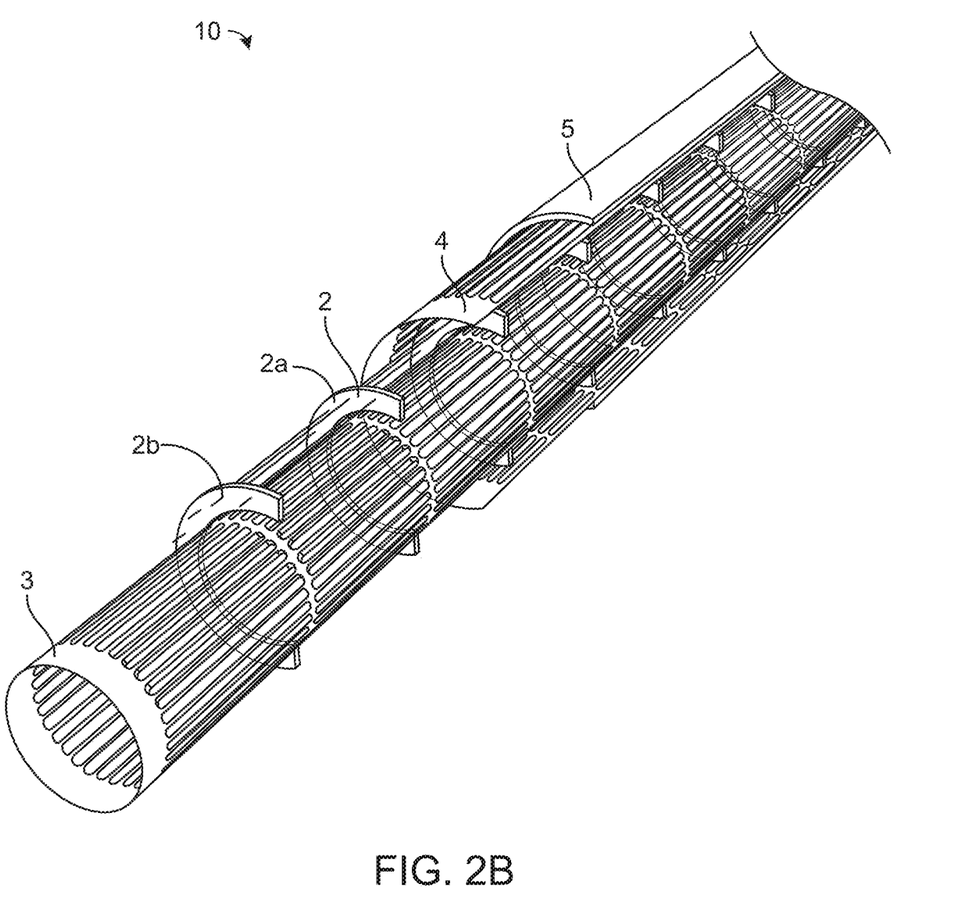
FIG. 2B illustrates a trimetric cut-away view of the ion source and neutron generator of FIG. 1.
Figure 3:
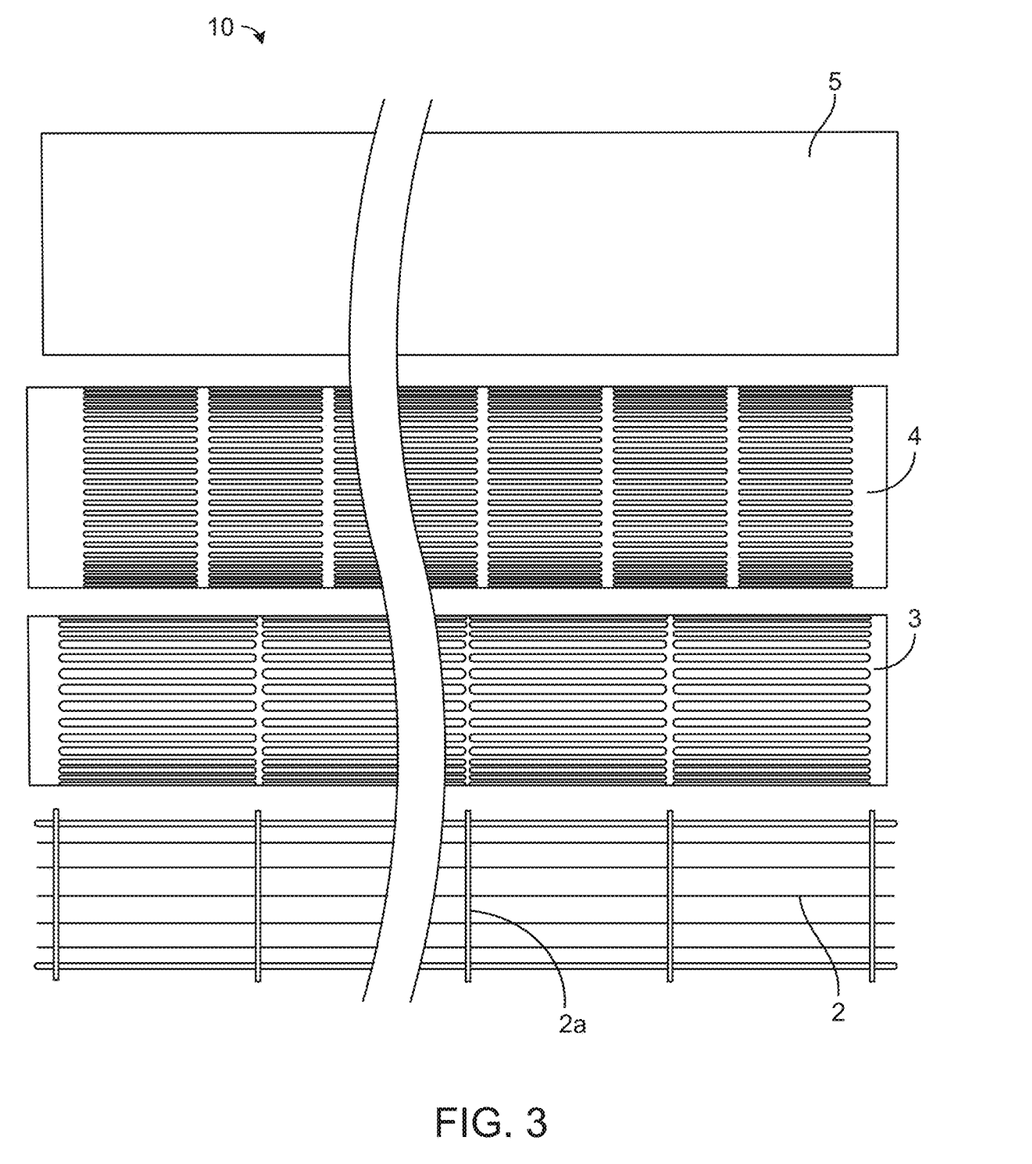
FIG. 3 illustrates an exploded profile view of the ion source of FIG. 1.

As illustrated in FIGS. 1 and 2A, the chamber of the ion source and/or neutron generator has a circular-cross section (i.e., the chamber may be cylindrical or spherical). FIG. 2B shows a trimetric cut-away view of the ion source and/or neutron generator in an embodiment having a cylindrical shape, i.e., in an embodiment in which the filament 2, the acceleration grid 3, the suppression grid 4, and/or the target 5 are each cylindrically formed. However, the geometry of the chamber is not limited in this regard in other embodiments. In other examples (not illustrated), the chamber may have the shape of a cube, a cuboid, a pyramid, a cone, etc. The geometry of the chamber may be customized to fit the particular application in which the ion source is used. In some examples, the chamber may be symmetrical about a central axis thereof. In other examples, the chamber may not be symmetrical about a central axis thereof. The ion source 10 is easy to construct and simper to replace than conventional ion sources.

Filament

The filament 2 is provided near a center of the chamber of the ion source and/or neutron generator. The filament 2 is connected to a voltage source 20 configured to apply a positive predetermined voltage to the filament 2 (discussed in further detail below), thereby heating the filament 2. The filament 2 is a high-current thermionic emitter in the embodiment shown. In some embodiments, field emission (e.g., even field emission) is used in addition to or instead of thermionic emission. In thermionic emission, the filament 2 is heated such that the electrons are supplied with the minimum energy required to overcome the attractive force holding the electrons to the filament 2, resulting in the discharge of electrons (thermions) from the filament 2. The minimum energy (i.e., the work function) is defined as the minimum thermodynamic work needed to remove an electron from a solid surface (i.e., the filament 2) to a point in the chamber immediately outside the filament 2. The work function is a characteristic of the material of the filament 2 and a state of contamination on the surface of the filament 2. The filament 2 may be made of any material capable of being heated to supply the electrons with the minimum energy without melting. Preferably, the filament 2 is made from a material having a low work function such that a large number of thermions are emitted. For example, the filament 2 may be made of a metal (e.g., tungsten or a tungsten alloy). In various embodiments, the material of the filament 2 is characterized by a high electron emissivity, low vapor pressure, high melting temperature, and resistance to ablation and sputtering. The filament 2 may be comprised of lanthanum hexaboride, cerium hexaboride, thoriated tungsten, barium aluminate, or a mixture of any two or more thereof, in various embodiments.

Referring to FIGS. 2A-2B, in some examples of the ion source and/or neutron generator, the filament 2 may optionally be provided in one or more filament guides 2a configured to maintain filament spacing and provide a mechanical support to suspend the filament 2 over the length of the apparatus. In one example, the filament guides 2a may include a plurality of apertures 2b (e.g., holes, slots, etc.) configured to receive a portion of the filament 2 therein (e.g., the filament 2 is threaded in and out of the apertures). In this example, the apertures 2b may be evenly or unevenly spaces along the filament guide 2a with apertures, and the filament 2 may be received in all or a subset of the apertures 2b. The filament guide 2a with apertures 2b may be made of non-conducting refractory material. In some embodiments, the non-conducting refractory material may be a ceramic. Illustrative glasses include glasses, clays, and metal oxides. In a particular example, the filament 2 may be of tungsten or a tungsten alloy and the filament guide may be made of ceramic.

In some examples, the ion source 10 includes one and only one filament 2. In other examples, the ion source 10 may include a plurality of filaments 2 spaced along and supported by the filament guide. In other embodiments, other approaches and/or structures for emitting electrons in the chamber may be used, and the systems and methods herein may be adapted accordingly.

Acceleration Grid

The acceleration grid 3 at least partially surrounded by the filament 2. The filament 2 and the acceleration grid 3 may be concentric, however that is not required. In some examples, the acceleration grid 3 may be a solid material including a plurality of apertures (i.e., holes, slots, etc.) provided in intervals along a length thereof. In other examples, the acceleration grid 3 may be a framework or mesh including a first set of parallel strips or threads of material extending in a first direction (e.g., along the length of the chamber) and a second set of strips or threads of material that intersect with and cross the first set of parallel strips such that apertures are provided between the first set and the second set. The apertures are configured to allow positive ions (e.g., hydrogen ions) generated in an ionization region (for example, between the acceleration grid 3 and the filament 2) to pass through the acceleration grid 3 to be collected (ion source) or accelerated towards the suppression grid 4 and the target 5 (neutron generator).

In some examples, the acceleration grid 3 is made of the same material as the filament 2. In other examples, the acceleration grid 3 is made of a different material than the filament 2. The acceleration grid 3 is made of a conductive material and may be resistant to ion damage. The acceleration grid 3 may be made of a refractory metal that is resistant to ablation and sputtering, for example niobium, molybdenum, tantalum, tungsten, rhenium, or a mixture or alloy of any two or more thereof.

The acceleration grid 3 is connected to the voltage source 20, which is configured to apply a positive predetermined voltage to the acceleration grid 3. The electric potential of the acceleration grid 3 is greater (more positive) than the electric potential of the filament 2. For example, the predetermined voltage applied to the acceleration grid may be +100100 V, while the predetermined voltage applied to the filament 2 may be +100000 V. Due to the electric potential difference (voltage biasing), thermions released by the filament 2 are accelerated outwards towards the acceleration grid 3. The arrangement and voltage biasing of the filament 2 and the acceleration grid 3 creates a low potential region, which confines energetic thermions (electrons) generated by thermionic emission of the filament 2. The thermions may be reabsorbed by the filament 2, but those with sufficient energy will become trapped (confined between the filament 2 and the acceleration grid 3). The trapped, energetic thermions circulate through the ionization region for a duration long enough to impact the low density neutral gas molecules according to the following reaction:

$$M+e^- \rightarrow M^+ \cdot 30\ 2e^- \qquad (3)$$

where M is a gas molecule and $e^-$ is an electron (thermion) that interacts with the gas molecule and transfers energy greater than the ionization energy of the molecule such that electrons are ejected from the gas molecule (electron ionization).

Put another way, and as noted above, a voltage source may be configured to apply a first positive voltage to the filament and a second positive voltage to the acceleration grid. The first positive voltage applied to the filament is configured to heat the filament to a temperature at which thermionic emission occurs and a plurality of thermions are generated. The second positive voltage is greater (more positive) than the first positive voltage. The plurality of thermions is configured to ionize the gas to generate positive ions in an ionization region in the chamber, including in a region between the filament and the acceleration grid. The first and second positive voltages are held substantially above the voltage at the wall of the chamber, which may be held at ground potential. This creates a recirculating electron trap with electrons oscillating back and forth in the center of the device, which cause ionization of the low-pressure background gas. Ions created in this region will accelerate outward toward the wall of the structure due to the electric field configuration.

Gaseous molecules (e.g., hydrogen), which are ionized by impacts with energetic thermions within the ionization region contribute positive charge to the ionization region, thereby reducing the negative potential of the built-up electron space charge produced by the thermionic currents. The vacuum levels within the acceleration region 3 are produced by an external vacuum source and are maintained at levels which reduce the probability of collisions with neutral particles within the ionization region. For example, the gas pressure in the ionization region may be less than or equal to 10 millitorr, for example, less than or equal to 5 millitorr or less than or equal to 1 millitorr. The low gas pressure in the ionization region increases ion yield or neutron yield, as the probability of the ion colliding with a gas molecule before collection or before impinging on the target 5 to produce a neutron is reduced.

Suppression Grid

In the neutron generator, the suppression grid 4 at least partially surrounds the filament 2. The suppression grid 4, the filament 2, and the acceleration grid 3 are concentric. The suppression grid 4 is made of the same material as the acceleration grid 3. Like the acceleration grid 3, in some examples, the suppression grid 4 may be a solid material including a plurality of apertures (i.e., holes, slots, etc.) provided in intervals along a length thereof. In other examples, the suppression grid 4 may be a framework or mesh including a first set of parallel strips or threads of material extending in a first direction (e.g., along the length of the chamber) and a second set of strips or threads of material that intersect with and cross the first set of parallel strips such that apertures are provided between the first set and the second set. The locations of the apertures in the suppression grid 4 correspond to the locations of the apertures in the acceleration grid 3. The apertures of the suppression grid 4 are configured to allow the positive ions that pass through the acceleration grid 3 from the ionization region to pass through the suppression grid 4 and accelerate towards the target 5.

The suppression grid 4 is connected to the voltage source 20, which is configured to apply a negative predetermined voltage to the suppression grid 4 (discussed in further detail below). When the positive ions within the region between the acceleration grid 3 and the filament 2 drift close to the acceleration grid 3, they are accelerated out of the ionization region by the electric potential difference between the acceleration grid 3 and the suppression grid 4. In other embodiments, magnetic fields may be used to achieve a similar effect as provided by the suppression grid 4.

The suppression grid 4 is made of a conductive material and may be resistant to ion damage, for example a high mass metal. The suppression grid 4 may be made of a refractory metal that is resistant to ablation and sputtering, for example niobium, molybdenum, tantalum, tungsten, rhenium, or a mixture or alloy of any two or more thereof.

Target

In the neutron generator, the target 5 at least partially surrounds the suppression grid 4 (e.g., the target 5 may not surround an area above and/or below the suppression grid 4). The target 5, the suppression grid 4, and the acceleration grid 3 are concentric. The target 5 may be made of a solid, metallic-hydride forming material. The material of the target 5 may be selected such that when fully loaded, there is a 1:1 to 2:1 ratio between hydrogen provided on the target 5 and the material from which the target 5 is made. The material of the target 5 may be a conductive metal or semi-metal with an affinity for absorbing hydrogen, preferably low mass materials with very small nuclear interaction cross-sections. For example, the target 5 may be made of carbon, aluminum, titanium, magnesium, zirconium, yttrium, scandium, erbium, or a mixture or alloy of any two or more thereof.

In some examples, the target 5 is (or is integrated into) the wall of the chamber itself. In other examples, the target 5 is a layer provided on an inner surface of the chamber or an outer surface of the chamber. In examples in which the target 5 is a layer, the target 5 may optionally be backed by a low hydrogen solubility metal or the low hydrogen solubility metal may form the wall of the chamber itself. The low hydrogen solubility metal may be stainless steel.

The target 5 is not connected to the voltage source 20, and is held at ground potential (substantially 0V). After travelling outwards through the apertures in the acceleration grid 3 and the suppression grid 4, positive ions enter the region between the suppression grid 4 and the target 5. In this region, the positive ions stop accelerating and travel ballistically to impinge upon the target 5. The impinging ions are either implanted into the target 5, or impact previously implanted ions to produce a fusion neutron. In examples of the neutron generator in which positive ions generated in the ionization energy are hydrogen isotopes, a hydrogen concentration builds up on the target 5 such that the hydrogen isotopes have a chance of colliding with another hydrogen isotope on the target 5 to create a neutron according to Reactions (1) and (2) described above.

When high energy ions impact the target 5, approximately 2-3 secondary electrons may be emitted from the surface of the target 5, which is held at a potential slightly higher than that of the suppression grid 4. Due to the electric potential difference between the target 5 and the suppression grid 4, the secondary electrons are reflected back into the target 5, which reduces electron heating of the acceleration grid 3 and prevents unwanted electron currents in the ionization region provided between the acceleration grid 3 and the filament 2. In other embodiments, magnetic fields may be used to achieve a similar effect as provided by the suppression grid 4.

Voltage Source and Controller

Figure 4:
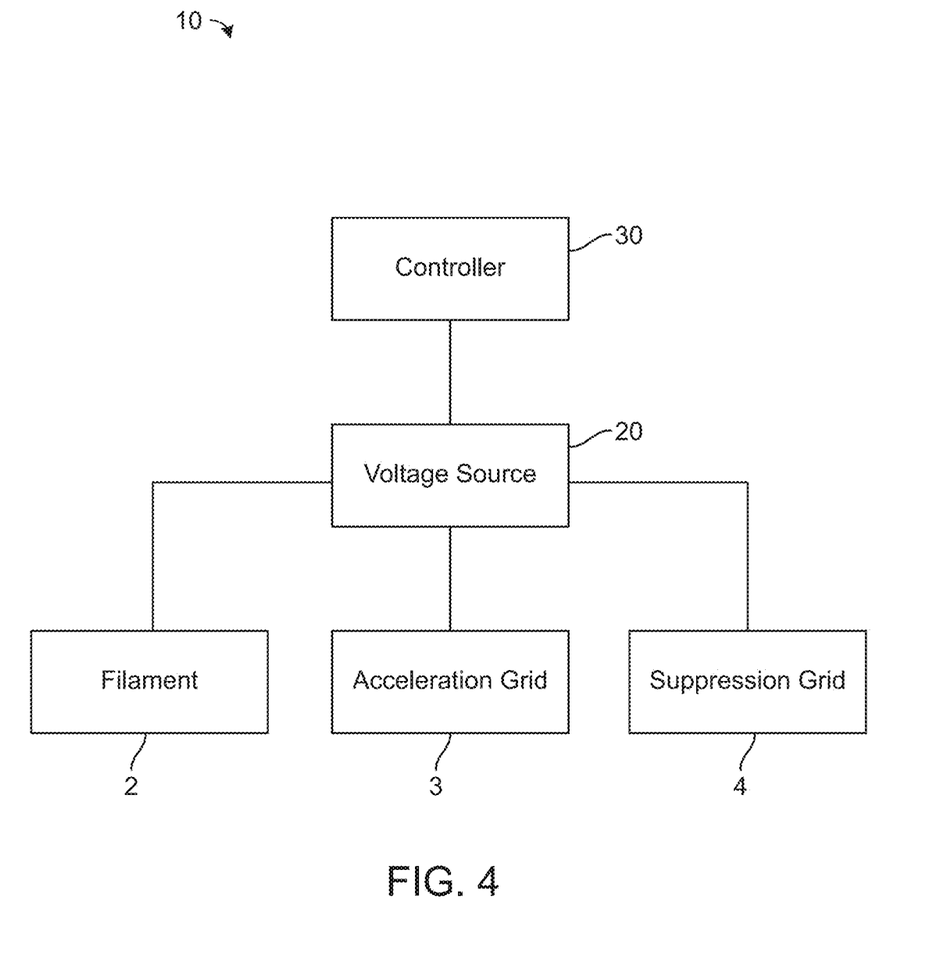
FIG. 4 illustrates a control system for the ion source of FIG. 1, where the control system includes a controller and a voltage source.

The voltage source 20 is provided external to the chamber. The voltage source 20 may be any known voltage source. A controller 30 may be provided and programmed to independently control the voltage supplied to each of the filament 2, the acceleration grid 3, and the suppression grid 4. The controller 30 may vary the voltage supplied to each of the filament 2, the acceleration grid 3, and the suppression grid 4 to tune the system or vary an ion or neutron yield. A control panel or display may be provided to allow a user to select individual, different voltages to be supplied to each of the filament 2, the acceleration grid 3, and the suppression grid 4.

As discussed above, the target 5 is held at ground potential, while the suppression grid 4 is held at a slightly negative voltage with respect to the ground potential. The acceleration grid 3 is held at a high positive voltage with respect to the ground potential, and the filament 2 is held at a slightly positive voltage with respect to the voltage of the acceleration grid 3. This electronic arrangement reduces the probability of unwanted electrical arcing, and protects the filament 2 from damage due to arcing or high energy electron currents.

In examples of the neutron generator in which the chamber is cylindrical, a cylindrical neutron generator of a predetermined length (determined by the specific application) is configured to produce an axially aligned, uniform, and isotropic neutron flux. The cylindrical arrangement of the components allows the neutron generator to produce high ion-current densities without space-charge limitations.

The construction and arrangements of the ion source and/or neutron generator, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Embodiments of the subject matter and the operations described in this specification (for example, voltage control) can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

What is claimed is:

1. An ion source comprising:
   a chamber configured to contain a gas and comprising a first end and a second end;
   an acceleration grid positioned in the chamber, oriented along a first direction extending between the first end and the second end of the chamber, surrounding an open center region of the chamber, and comprising a plurality of apertures spaced around the open center region of the chamber;
   a plurality of filaments provided in the chamber, oriented along the first direction, and spaced around a circumference of the acceleration grid such that the plurality of filaments surround the acceleration grid; and
   a voltage source configured to apply a first positive voltage to the plurality of filaments relative to the chamber and a second positive voltage to the acceleration grid relative to the chamber;
   wherein:
   the first positive voltage is configured to heat the plurality of filaments to a temperature at which thermionic emission occurs and a plurality of thermions are generated;
   the plurality of thermions is configured to ionize the gas to generate positive ions; and
   the plurality of apertures allow the positive ions to pass through the acceleration grid and into or out of the open center region of the chamber.

2. The ion source of claim 1, wherein the second positive voltage of the acceleration grid relative to the chamber and the first positive voltage of the plurality of filaments relative to the chamber are configured to create a recirculating electron trap with electrons oscillating back and forth in the open center region of the chamber, the recirculating electron trap causing ionization of the gas in the open center region.

3. The ion source of claim 1, further comprising a filament guide, wherein the plurality of filaments are threaded through the filament guide to maintain filament spacing.

4. The ion source of claim 3, wherein at least one of the plurality of filaments or the acceleration grid comprises tungsten or a tungsten alloy, and the filament guide comprises a non-conducting refractory material.

5. The ion source of claim 4 wherein the non-conducting refractory material comprises a ceramic.

6. The ion source of claim 1, comprising a suppression grid that surrounds the filaments and acceleration grid, wherein the voltage source is configured to apply a third negative voltage to the suppression grid.

7. The ion source of claim 6, wherein the suppression grid comprises a plurality of suppression grid apertures configured to allow the positive ions to pass therethrough; and
due to a difference in electrical potential between the acceleration grid and the suppression grid, the ions source is configured such that the positive ions that pass through the acceleration grid are accelerated towards the suppression grid.

8. The ion source of claim 1, wherein the chamber is configured to maintain a pressure of less than 1 millitorr.

9. The ion source of claim 1, wherein the chamber is configured to maintain a pressure of less than 0.1 millitorr.

10. The ion source of claim 1, wherein the acceleration grid comprises a plurality of strips and the plurality of apertures are provided between the plurality of strips.

11. The ion source of claim 1, wherein the acceleration grid is cylindrical and the plurality of filaments are arranged cylindrically.

12. The ion source of claim 1, wherein the plurality of apertures are provided in intervals along a length of the acceleration grid.

13. A nuclear reaction generator comprising:
a chamber configured to contain a gas, comprising a first end and a second end, and providing a target configured for neutron generation;
an acceleration grid positioned in the chamber, oriented along a first direction extending between the first end and the second end of the chamber, surrounding an open center region of the chamber, and comprising a plurality of apertures spaced around the open center region of the chamber;
a plurality of filaments provided in the chamber, oriented along the first direction, and spaced around a circumference of the acceleration grid such that the plurality of filaments surround the acceleration grid; and
a voltage source configured to apply a first positive voltage to the plurality of filaments relative to the chamber and a second positive voltage to the acceleration grid relative to the chamber;
wherein:
the first positive voltage is configured to heat the plurality of filaments to a temperature at which thermionic emission occurs and a plurality of thermions are generated;
the plurality of thermions is configured to ionize the gas to generate positive ions in the chamber; and
the plurality of apertures allow the positive ions to pass through the acceleration grid and into or out of the open center region of the chamber.

14. The nuclear reaction generator of claim 13, wherein the target is configured such that nuclear reactions occur when the positive ions interact with the target.

15. The nuclear reaction generator of claim 13, wherein the target is at least one of positioned on an inner surface of a wall of the chamber, positioned on an outer surface of the wall of the chamber, or integrated into the wall of the chamber.

16. The nuclear reaction generator of claim 13, wherein the second positive voltage of the acceleration grid relative to the chamber and the first positive voltage of the plurality of filaments relative to the chamber are configured to create a recirculating electron trap with electrons oscillating back and forth in the open center region of the chamber, the recirculating electron trap causing ionization of the gas in the open center region.

17. The nuclear reaction generator of claim 16, comprising a suppression grid that is concentric with and surrounds the filaments and acceleration grid, wherein the voltage source is configured to apply a third negative voltage to the suppression grid relative to the chamber.

18. The nuclear reaction generator of claim 17, wherein:
the suppression grid comprises a plurality of suppression grid apertures configured to allow the positive ions to pass therethrough; and
due to a difference in electrical potential between the acceleration grid and the suppression grid, the nuclear reaction generator is configured such that the positive ions that pass through the acceleration grid from the open center region are accelerated towards the suppression grid.

19. The nuclear reaction generator of claim 13, wherein the target is comprised of a metal or semi-metal.

20. The nuclear reaction generator of claim 19, wherein the metal or semi-metal is titanium or a titanium alloy.

21. The nuclear reaction generator of claim 13, wherein the target comprises carbon, aluminum, magnesium, zirconium, yttrium, scandium, erbium, or a mixture or alloy of any two or more thereof.

22. The nuclear reaction generator of claim 13, wherein the target comprises a layer provided
on an interior surface of the chamber
or on a metal provided on the interior surface of the chamber.

23. The nuclear reaction generator of claim 22,
wherein the target comprises titanium or an alloy of titanium.

24. The nuclear reaction generator of claim 13, wherein the chamber is configured to maintain a pressure of less than 1 millitorr.

25. The nuclear reaction generator of claim 13, wherein the chamber is configured to maintain a pressure of less than 0.1 millitorr.

26. The nuclear reaction generator of claim 13, further comprising a filament guide supporting the plurality of filaments,
wherein at least one of the filaments or the acceleration grid comprises tungsten or a tungsten alloy,
and the filament guide comprises a non-conducting refractory material.

27. The nuclear reaction generator of claim 26 wherein the non-conducting refractory material comprises a ceramic.

28. The nuclear reactor generator of claim 13, wherein the acceleration grid comprises a plurality of strips and the plurality of apertures are provided between the plurality of strips.

29. The nuclear reactor generator of claim 13, wherein the acceleration grid is concentric with the plurality of filaments.

30. The nuclear reactor generator of claim 29, wherein the plurality of apertures are provided in intervals along a length of the acceleration grid.

* * * * *